3,758,352
POROUS FIBROUS SUBSTRATE STRUCTURE
PRODUCED IN OXIDIZING ATMOSPHERE
Clarence E. Northway, Lake View Terrace, and Ronald L. Pegg, Costa Mesa, Calif., assignors to Haveg Industries, Inc., Wilmington, Del.
No Drawing. Filed May 23, 1972, Ser. No. 256,069
Int. Cl. B44d 1/02
U.S. Cl. 156—60                                    18 Claims

ABSTRACT OF THE DISCLOSURE

A fibrous graphite unit is made by taking plies of cloth of at least 80% carbon assay (carbon or graphite cloth) which is impregnated with a B-stage resin and stacking one on another to form a substrate unit. The unit is then cured and is then treated in an oxygen containing atmosphere to decompose the resin to obtain a more porous substrate than if the resin were pyrolyzed in an inert atmosphere. An alternate method is to pyrolyze the unit in an inert atmosphere and then place the pyrolyzed unit in an oxygen containing atmosphere to produce a more porous unit. The unit may be left in its present state or be carbonized or graphitized, depending upon desired results. The unit is also infiltrated with pyrolytic carbon which may be converted to pyrolytic graphite.

---

Reinforced plastic composite units and massive graphite units have been the two basic material types capable of withstanding rocket nozzles and reentry environments. Each of these two types of materials has advantages and limitations but has been successfully developed on innumerable space and missile systems for thermal protection. The reinforced plastic composite unit is produced by taking plies of B-stage phenol-formaldehyde resin impregnated carbon or graphite cloth and laying the plies upon one another to form a unit, compressing the unit by a given pressure, and heating to cure (convert to C-stage) the phenol-formaldehyde resin while the unit is under the given pressure. This reinforced plastic composite exhibits typically high erosion rates and poor temperature strength retention as compared to massive graphites. However, their inherently high initial strength, low thermal conductivity, and good thermal shock resistance permit the fabrication of large complex shapes.

Massive graphite articles are those which are made by mixing a graphitizable furfuryl alcohol resin or pitch with graphite particles and either molding or extruding the same into a unit, curing or polymerizing the binder and then graphitizing the unit. This unit displays high erosion resistance rates and high temperature strength retention when compared to a reinforced plastic composite unit but also exhibits lower initial strength and poor thermal shock resistance which confines its use to small size and simple shapes.

Past attempts at combining the features of massive graphite units and reinforced plastic composites have been made by taking individual layers of B-stages phenol-formaldehyde resin impregnated carbon or graphite cloth and laying one on top of another to form a unit with the phenol-formaldehyde resin acting as a binder or matrix for holding the layers of cloth together.

The phenol-formaldehyde resin binder is then cured and afterwards, depending upon results desired, is either brought to a pyrolyzed, carbonized or graphitized condition resulting in a decrease in bulk density coupled with a corresponding increase in porosity to form a substrate unit which at either of these stages is between 10% and 20% porous by volume. The substrate is then redensified by filling the voids with phenol-formaldehyde resin, furfuryl alcohol or graphitizable pitch, all in liquid form.

When phenolic resin or furfuryl alcohol is used the impregnation takes place at room temperature and when pitch is used, impregnation takes place at a temperature where it is in a liquid state. The redensified substrate is then cured and then, depending upon desired properties, either pyrolyzed, carbonized or graphitized. This redensification cycle is repeated as many times as necessary to either completely fill the voids or partially fill the voids to give the resulting product a given density. Instead of the material mentioned, the substrate can be redensified with pyrolytic graphite by introducing methane gas at approximately 1700° F.–2200° F. resulting in depositing pyrolytic carbon on the substrate and then graphitizing the pyrolytic carbon and/or unit, as the case may be, at about 5000° F. A well known method of this type of redensification is disclosed by Example 1 of U.S. Pat. No. 3,107,180 issued to Diefendorf. The use of pyrolytic carbon in this structure has the disadvantage of penetrating only from between 50 and 200 mils into the surface of the substrate since due to the compaction of the unit, the pore sizes are such that the pyrolytic carbon deposits close off the outer pores before penetrating deeply into the unit.

The fibrous graphite unit has shown increased erosion resistance over the reinforced plastic composite, but the continued development of high energy propulsion and more sophisticated maneuverable reentry systems have created a need for even better erosion resistance.

It is an object of this invention to provide a fibrous graphite structure which exhibits very high erosion resistance when compared to prior art structures.

It is a further object of this invention to employ a substrate which is very porous for impregnation of a substantial amount of pyrolytic carbon uniformly throughout the thickness of the substrate which is then converted to pyrolytic graphite and results in a product of substantial improvement over prior art products.

The porous substrate precursor can be formed by several different methods. One method is to take B-stage resin impregnated plies of carbon or graphite cloth and stack one on top of another. Another method is by wrapping a continuous tape of B-stage resin impregnated carbon cloth or graphite cloth in the manner as disclosed in either Trimble U.S. Pat. 3,402,085 or Trimble U.S. Pat. 3,402,091. Still another method is to place plies of carbon or graphite cloth, lay one on top of another and place the same into a container. A binder, in solution (A-stage) is introduced into the container to saturate the unit. The excess binder is then drained from the container. The unit is then compressed to a desired volume and heated to evaporate the solvents and bring the resin to B-stage condition. If the resin is in A-stage when impregnated cloth layers are stacked one upon an other or when the impregnated tape is wound, the stacked or wound structure will be heated at atmospheric pressure in an oven at a temperature of from 165° F. to 250° F. for up to 72 hours to bring the resin to B-stage.

If carbon cloth is used, it must be of at least 80% carbon assay, and preferably of at least 97% carbon assay. The binders are of thermosetting materials, for example: phenol-formaldehyde resin, furfuryl alcohol, furfural, and epoxylated novalac. These binders are capable of passing upon heating from A-stage wherein the resin is liquid at ambient temperature to a B-stage wherein the resin is a thermoplastic solid or a partially gelled liquid of sufficient viscosity to behave as a thermoplastic solid and upon further heating to a C-stage wherein the resin is a thermoset solid. Normally, the resin has been brought to the B-stage condition prior to stacking the impregnated cloth layers or winding the impregnated tape.

The resin is then cured (brought to C-stage from B-stage) by placing the substrate unit into a mold and raising the temperature in increments to a range of 275° F. to 350° F. over a period of 2 to 4 hours at a pressure between 15 p.s.i.g. and 10,000 p.s.i.g.

It is a normal procedure to then take the resin cured substrate and place the same in an oven to pyrolyze the resin in an inert atmosphere. An inert atmosphere has been required since the prior art desired a unit with highest possible carbon yield after pyrolyzation or carbonization, which is usually about 45%–55% of the initial binder. This same unit is about 10%–20% porous and the available porosity to be filled with pyrolytic carbon is about 5%–10%.

However, in one method of applying the concept of this invention, the resin cured substrate is placed into an oven or furnace having an oxidizing atmosphere at a temperature of between 400° F. and 900° F. for a minimum of about 3 hours. The oxygen content of the atmosphere should be between 10% and 30% by volume with 20% to 24% being preferred. The preferred temperature range is between 500° F. and 800° F. for maximum porosity and the minimum preferred period of oxidation treatment is 6 hours. As an alternate employment of this invention, the resin cured unit may be normally pyrolyzed by removing the substrate from the mold and placing the same in an oven or furnace having an inert atmosphere and increasing the temperature to a maximum of between 750° F. and 800° F. over a period of 2 hours to 5 days and subjecting the unit to the maximum temperature for a period of from 2 to 20 hours. The pyrolyzed unit, which has lost approximately 30% of the initial binder and is about 10%–20% poous, is then placed into an oven in an oxidizing atmosphere containing 10%–30% oxygen by volume, preferably 20% to 24%, at a temperature range of between 400° F. and 900° F., preferably between 500° F. and 800° F., for a minimum of at least one hour and no longer than 72 hours to reduce the resin binder constant even further.

The porosity is controlled by the time, temperature and the amount of oxygen in the oxidizing atmosphere. The binder can be completely eliminated if subjected to this oxidizing atmosphere for a long enough period. Obviously, complete elimination of the binder is not desirable and, depending upon desired features, the amount of binder elimination will be selected and can be between 60% and 95% which is substantially greater than the 45%–55% elimination of binder by pyrolyzing and carbonizing the unit in an inert atmosphere. For instance, if the binder is 35% by weight of the unit after the binder is cured, then the binder will be about 16%–19% by weight of the unit after the binder is pyrolyzed and carbonized in an inert atmosphere and will be about 2%–10% by weight of the unit after the binder is treated in an oxidizing atmosphere and carbonized in an inert atmosphere. Also, if carbon cloth and carbon fillers are used, each will also be reduced in the oxidizing atmosphere.

The porous substrate may be left in the oxidized treated stage or either carbonized or graphitized, depending upon desired results. The substrate unit is usually carbonized and this is effected by increasing the temperature further to a maximum of either 1500° F. to 1800° F. or 3000° F. to 3200° F. over a further period of 2 hours to 5 days and subjecting the unit to this maximum temperature for a period of from 2 to 20 hours; and then graphitized by increasing the temperature further to a maximum of from about 4800° F. to 5400° F. quite rapidly (depending upon equipment used) and subjecting the unit to this maximum temperature from about 15 to 480 minutes. In any of the oxidized treated, carbonized, or graphitized stages, the substrate can have an available volume porosity of up to 60% to be filled with pyrolytic carbon.

The porous substrate unit, made by any of the above methods, is then placed into a chamber and a vacuum pulled on the substrate to evacuate the voids and then the substrate is redensified by infiltrating with methane gas which deposits pyrolytic carbon in the substrate under vacuum at a temperature from about 1700° F. to 4200° F. for a period of about 100 to 200 hours. A preferred temperature range for infiltration is between 1700° F. and 2200° F. in order to provide a structure with maximum mechanical properties and resistance to thermal shock. This infiltration procedure is standard and can be as described in Example 1 of Diefendorf U.S. Pat. No. 3,107,180. After the deposit of pyrolytic carbon, the unit is then usually baked at temperatures between 5000° F. and 5500° F. for a period of 15 to 480 minutes to graphitize the pyrolytic carbon and, if necessary, the binder portion of the unit and the carbon cloth portion. The redensifying procedure may be repeated as often as necessary to obtain the desired density prior to graphitizing the pyrolytic carbon. It should be realized that the time periods given for curing, pyrolyzing, and graphitizing are mainly dependent upon the size of the unit.

The concept of this invention may also be applied to a substrate wherein the resin has been transformed from a B-stage to a C-stage in a free standing state (atmospheric pressure) thereby producing a porous resin cured substrate. The resin of this substrate may then be treated in an oxygen containing atmosphere in accordance with the above principles of this invention, resulting in a substrate of increased porosity. Also, the concept of this invention may be applied to a substrate unit wherein the resin is in B-stage. The resin of this substrate is then treated at temperatures of 400° F. to 900° F. in a free standing state (atmospheric pressure) in an oxygen containing atmosphere in accordance with the above principles of this invention. The resin will expand in passing from the B-stage to the C-stage thus creating voids in addition to that created in decomposing the resin. The creation of voids by C-staging the resin under atmospheric pressure does not form a part of this invention and is the subject matter of R. L. Pegg, Ser. No. 256,070, filed May 23, 1972, entitled Expanded Porous Substrate for Fibrous Graphite Structure (common assignee) filed concurrently herewith.

The following examples illustrate the invention.

EXAMPLE 1

A tape wound cylinder was constructed from a B-stage phenol-formaldehyde resin impregnated graphite cloth. The resin binder weighed about 35% of the total unit and a carbon filler weighed about 15% of the total unit. The cylinder was treated at 325° F. at a pressure of 1000 p.s.i. for a period of 2 hours to cure the resin. Four (4) sections were cut from the cylinder and are identified as samples Control, A, B and C. The control sample was carbonized in an inert atmosphere in accordance with prior art methods. Samples A and B were treated in an oxidizing atmosphere prior to being carbonized in accordance with prior art methods. Sample C was treated in an oxidizing atmosphere for 48 hours and was inspected after certain periods of oxidation treatment.

A press molded sample (D) was prepared by laying on one another plies of B-stage phenol-formaldehyde resin impregnated graphite cloth to form a unit and treating the same at 325° F. under 1000 p.s.i. for 3 hours to cure the resin. The resin binder weighed about 35% of the total unit and a carbon filler weighed about 15% of the total unit. The sample was treated in an oxidizing atmosphere for 84 hours and was inspected after certain periods of oxidation treatment Thereafter, the sample was carbonized in an inert atmosphere in accordance with prior art procedures.

The results for samples identified as Control, A, B, C and D are given in the following table.

TABLE

| Sample No. | Atmosphere | Temperature, °F. | Period held at temperature | Total wt. loss, percent | Porosity, percent |
|---|---|---|---|---|---|
| Control | Inert | (1) | (1) | 16.7 | 20.4 |
| A | 17-21% oxygen | 600 | 24 hours | 26.8 | 24.6 |
| A | Inert | (1) | (1) | 33 | (2) |
| B | 17-21% oxygen | 600 | 60 hours | Not measured | |
| B | Inert | (1) | (1) | 38.1 | 32.1 |
| C | 17-21% oxygen | 750 | 8 hours | 27.6 | (2) |
| C | do | 750 | 24 hours | 35.1 | 20-25 |
| C | do | 750 | 48 hours | 38.9 | 25-30 |
| D | 17-21% oxygen | 600 | 16 hours | 18.0 | 19-22 |
| D | do | 600 | 40 hours | 22.2 | 24-28 |
| D | do | 600 | 84 hours | 27.2 | 30-34 |
| D | Inert | (1) | (1) | 30.5 | 34 |

[1] Brought up 1,500° F. over a period of 3 days to carbonize.
[2] Slightly increased.

Sample A shows an approximate 25% increase in porosity over the control sample. Sample B, which was treated with the oxidizing atmosphere for a longer period than sample A, showed an approximate 60% increase in porosity over the control sample. Sample C, which was not carbonized, showed about a 25% to 50% increase in porosity over the control sample. Sample D, which was treated with the oxidizing atmosphere for a longer period than sample B, showed an approximate increase of 70% in porosity over the control sample.

What we claim and desire to protect by Letters Patent is:

1. A process for making a porous fibrous substrate comprising:
   (1) providing a substrate unit comprising plies of B-stage graphitizable resin impregnated fibrous cloth having a carbon assay of at least 80%; and
   (2) treating said unit at temperatures between 400° F. and 900° F. in an atmosphere containing 10% to 30% by volume of oxygen to increase the porosity of said unit.

2. The process as recited in claim 1 wherein step 2 is carried out at a temperature between 500° F. and 800° F. for a minimum period of at least 6 hours.

3. The process as recited in claim 1 wherein said binder is in the C-stage prior to step (2).

4. The process of claim 1 wherein the oxygen content is 20% to 24% by volume.

5. The process as recited in claim 1 comprising the additional step of infiltrating the unit with and depositing pyrolytic carbon therein, said unit being at least in the carbonized stage prior to said infiltration.

6. The process of claim 5 further comprising graphitizing at least the pyrolytic carbon.

7. A process for making a porous fibrous substrate comprising:
   (1) providing a substrate unit comprising plies of B-stage graphitizable resin impregnated fibrous cloth having a carbon assay of at least 80%;
   (2) pyrolyzing said unit; and
   (3) treating said pyrolyzed unit at temperatures between 400° F. and 900° F. in an atmosphere containing from 10% to 30% by volume of oxygen to increase the porosity of said unit from the porosity thereof after step (2).

8. The process as recited in claim 7 wherein step 3 is carried out at a temperature between 500° F. and 800° F. for a minimum period of at least 6 hours.

9. The process as recited in claim 7 wherein said binder is in the C-stage prior to step (2).

10. The process of claim 7 wherein the oxygen content is 20% to 24% by volume.

11. The process recited in claim 7 comprising the additional step of infiltrating the unit with and depositing pyrolytic carbon therein, said unit being at least in the carbonized stage prior to said infiltration.

12. The process of claim 11 further comprising graphitizing at least the pyrolytic carbon.

13. A process as recited in claim 1 wherein the fibrous cloth has a carbon assay of at least 97%.

14. A process as recited in claim 7 wherein the fibrous cloth has a carbon assay of at least 97%.

15. A process as recited in claim 1 comprising the further step of carbonizing the porous substrate unit.

16. A process as recited in claim 7 comprising the further step of carbonizing the porous substrate unit.

17. A product made by the process of claim 1.

18. A product made by the process of claim 7.

References Cited
UNITED STATES PATENTS

| | | | |
|---|---|---|---|
| 3,108,018 | 10/1963 | Lewis | 117—46 CC |
| 3,427,120 | 2/1969 | Shindo | 117—46 CC |

EDWARD G. WHITBY, Primary Examiner

U.S. Cl. X.R.

117—46 CB, 46 CC